(No Model.) 6 Sheets—Sheet 1.

J. R. WILLIAMS.
CIGAR BUNCHING MACHINE.

No. 401,090. Patented Apr. 9, 1889.

WITNESSES:
Gustave Dieterich
W. A. C. Matthis

INVENTOR
John R. Williams,
BY Chas. C. Gill
ATTORNEY

N. PETERS, Photo-Lithographer, Washington, D. C.

(No Model.) 6 Sheets—Sheet 1.
J. R. WILLIAMS.
CIGAR BUNCHING MACHINE.

No. 401,090. Patented Apr. 9, 1889.

WITNESSES:
Gustave Dieterich
W. A. Matthis

INVENTOR
John R. Williams,
BY Chas. C. Gill
ATTORNEY (No Model.) 6 Sheets—Sheet 2.

J. R. WILLIAMS.
CIGAR BUNCHING MACHINE.

No. 401,090. Patented Apr. 9, 1889.

(No Model.) 6 Sheets—Sheet 3.
J. R. WILLIAMS.
CIGAR BUNCHING MACHINE.
No. 401,090. Patented Apr. 9, 1889.
Fig. 6.
Fig. 7.
Fig. 8.
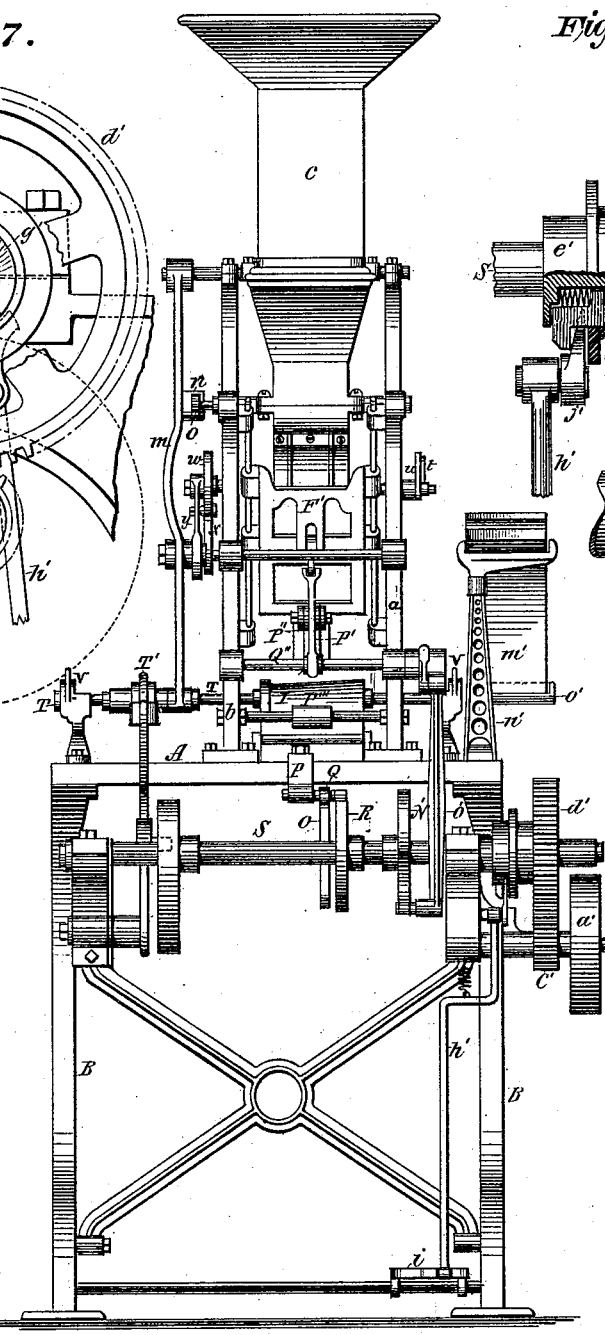
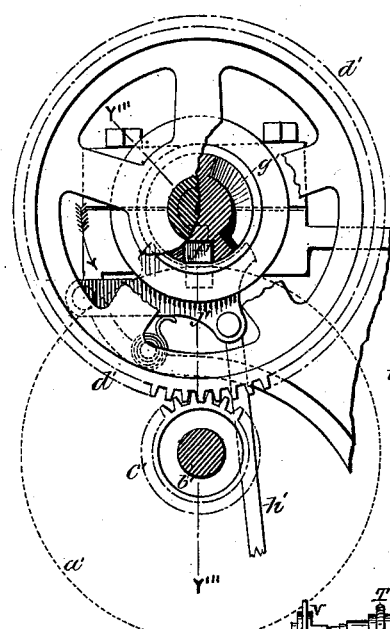
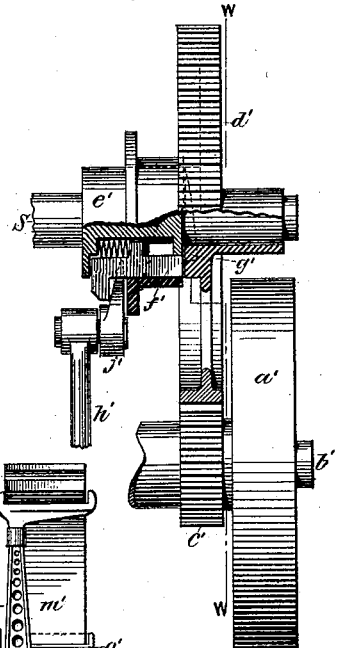
WITNESSES:
Gustave Dieterich
F. A. C. Matthis
INVENTOR
John R. Williams
BY
Chas. C. Gill
ATTORNEY

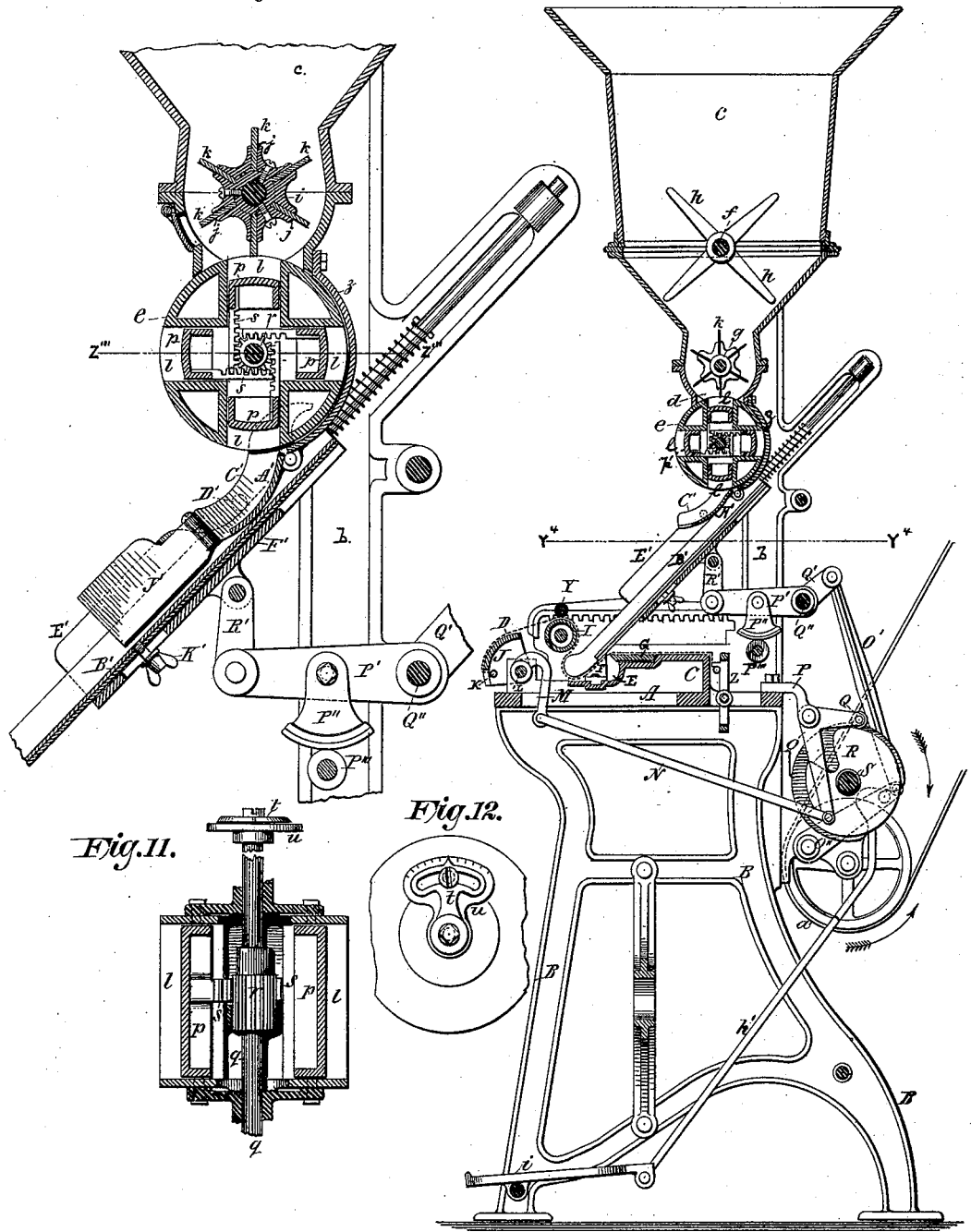

(No Model.) 6 Sheets—Sheet 5.

J. R. WILLIAMS.
CIGAR BUNCHING MACHINE.

No. 401,090. Patented Apr. 9, 1889.

WITNESSES:

INVENTOR
John R. Williams,
BY
Chas. O. Gill
ATTORNEY (No Model.) 6 Sheets—Sheet 6.

J. R. WILLIAMS.
CIGAR BUNCHING MACHINE.

No. 401,090. Patented Apr. 9, 1889.

WITNESSES:
INVENTOR
John R. Williams,
BY
Chas. E. Gill
ATTORNEY

UNITED STATES PATENT OFFICE.

JOHN R. WILLIAMS, OF NEWARK, NEW JERSEY, ASSIGNOR TO THE JOHN R. WILLIAMS COMPANY, OF NEW YORK, N. Y.

CIGAR-BUNCHING MACHINE.

SPECIFICATION forming part of Letters Patent No. 401,090, dated April 9, 1889.

Application filed July 19, 1888. Serial No. 280,409. (No model.)

*To all whom it may concern:*

Be it known that I, JOHN R. WILLIAMS, a citizen of the United States, and a resident of Newark, in the county of Essex and State of New Jersey, have invented certain new and useful Improvements in Cigar-Bunching Machines, of which the following is a specification.

The invention relates to improvements in cigar-bunching machines; and it consists in the elements hereinafter described, and pointed out in the claims, the object of the invention being the production of a machine capable of being operated either by hand or steam power, and upon which cigar-bunches of varying sizes may be rapidly and effectually rolled preparatory to receiving the ultimate wrapper finishing the cigar.

Figure 1:
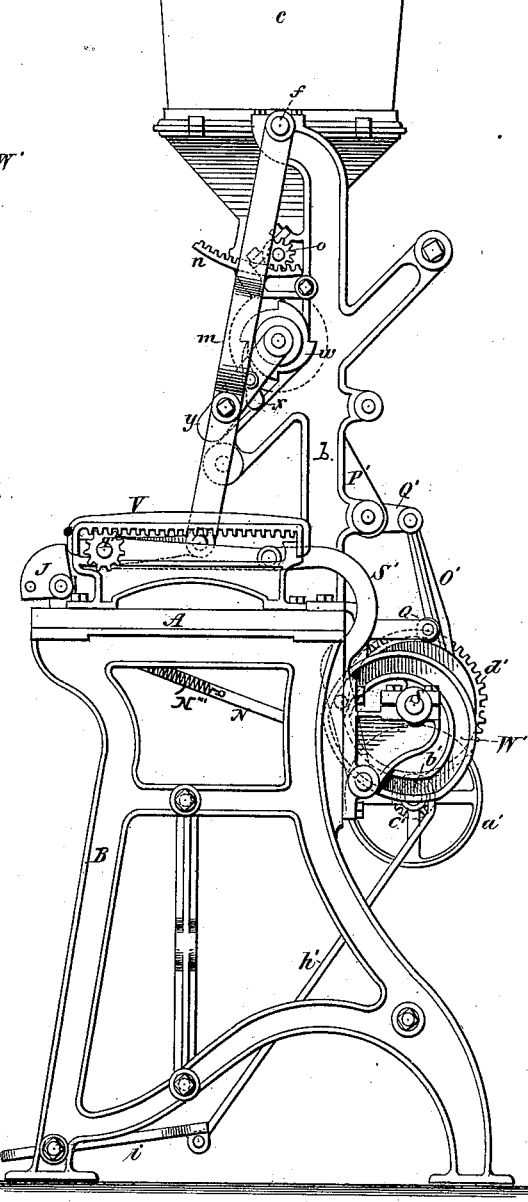
Figure 2:
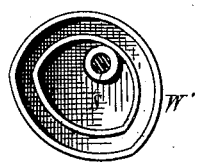
Figure 3:
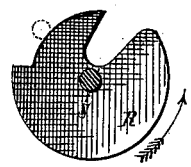
Figure 4:
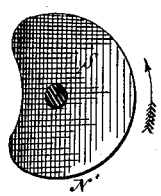
Figure 1:
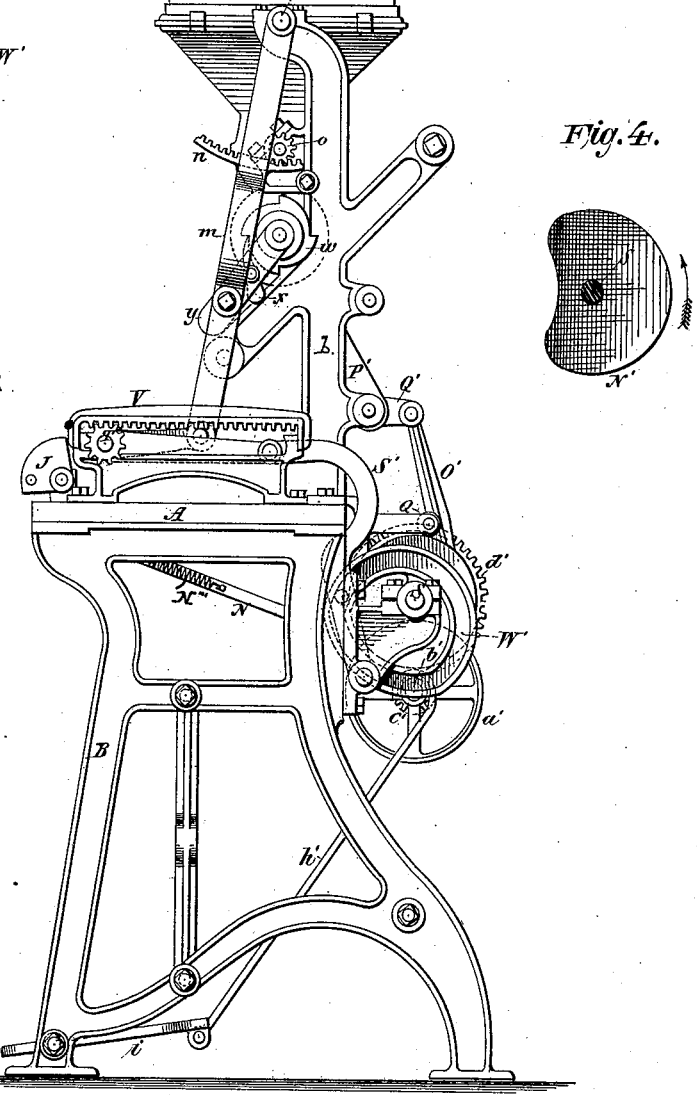
Figure 2:
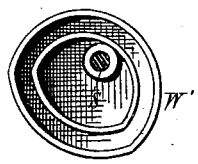
Figure 3:
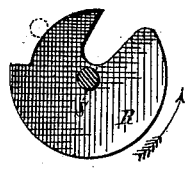
Figure 4:
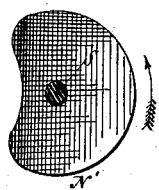
Figure 5:
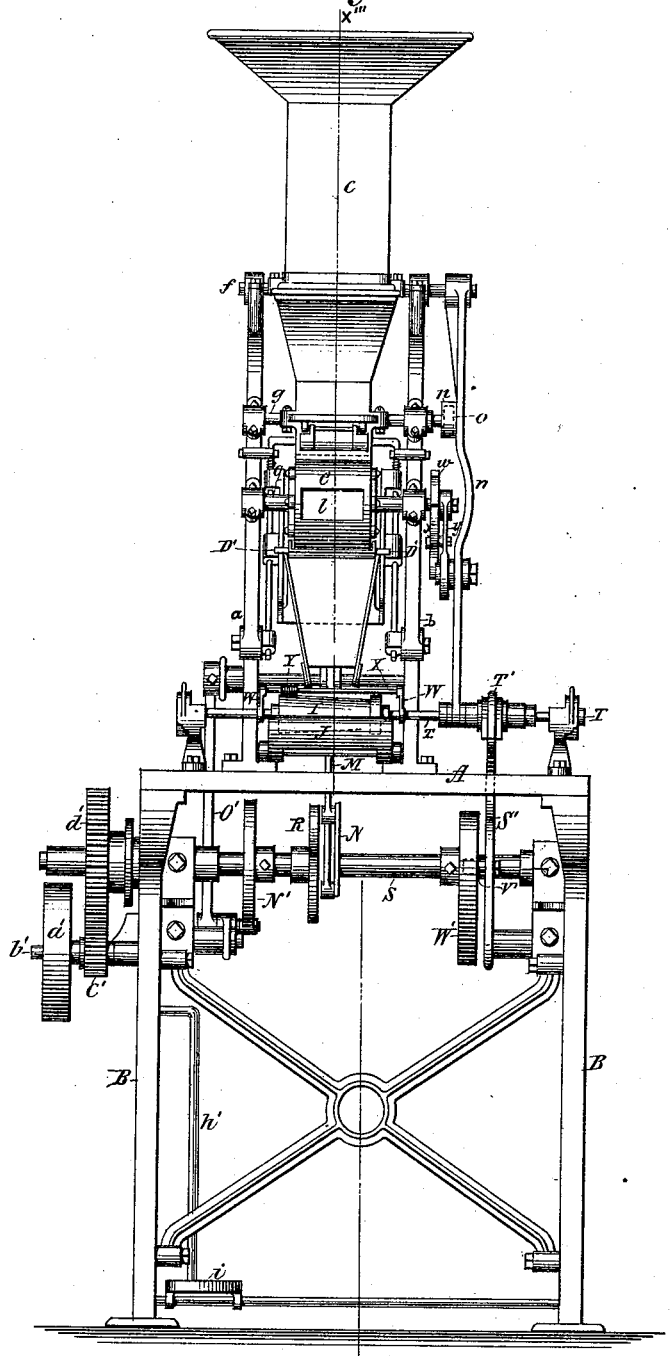
Figure 13:
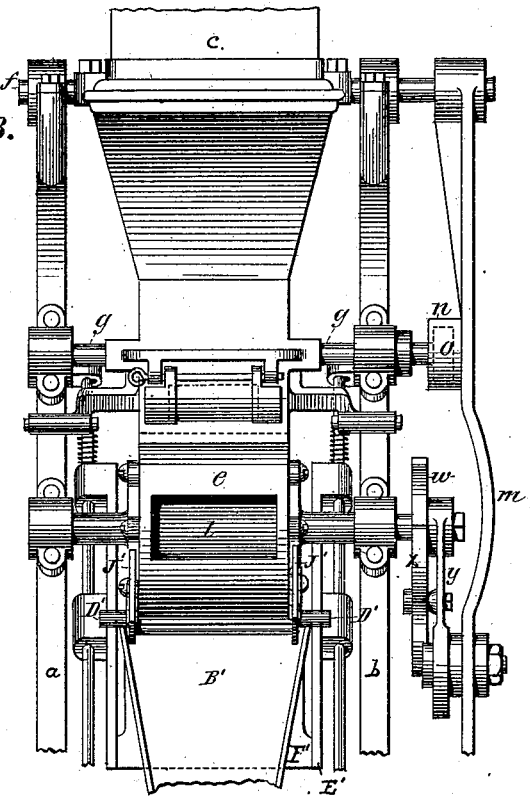
Figure 15:
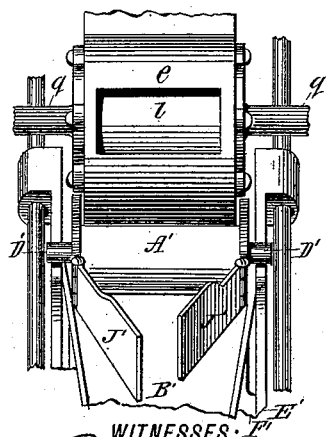
Figure 16:
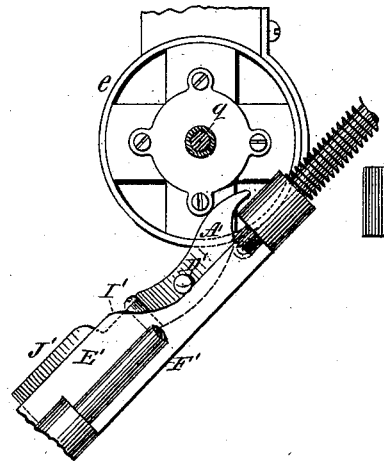
Figure 14:
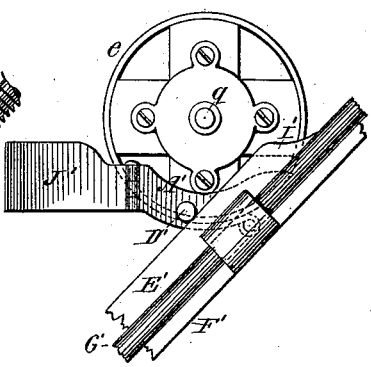
Figure 17:
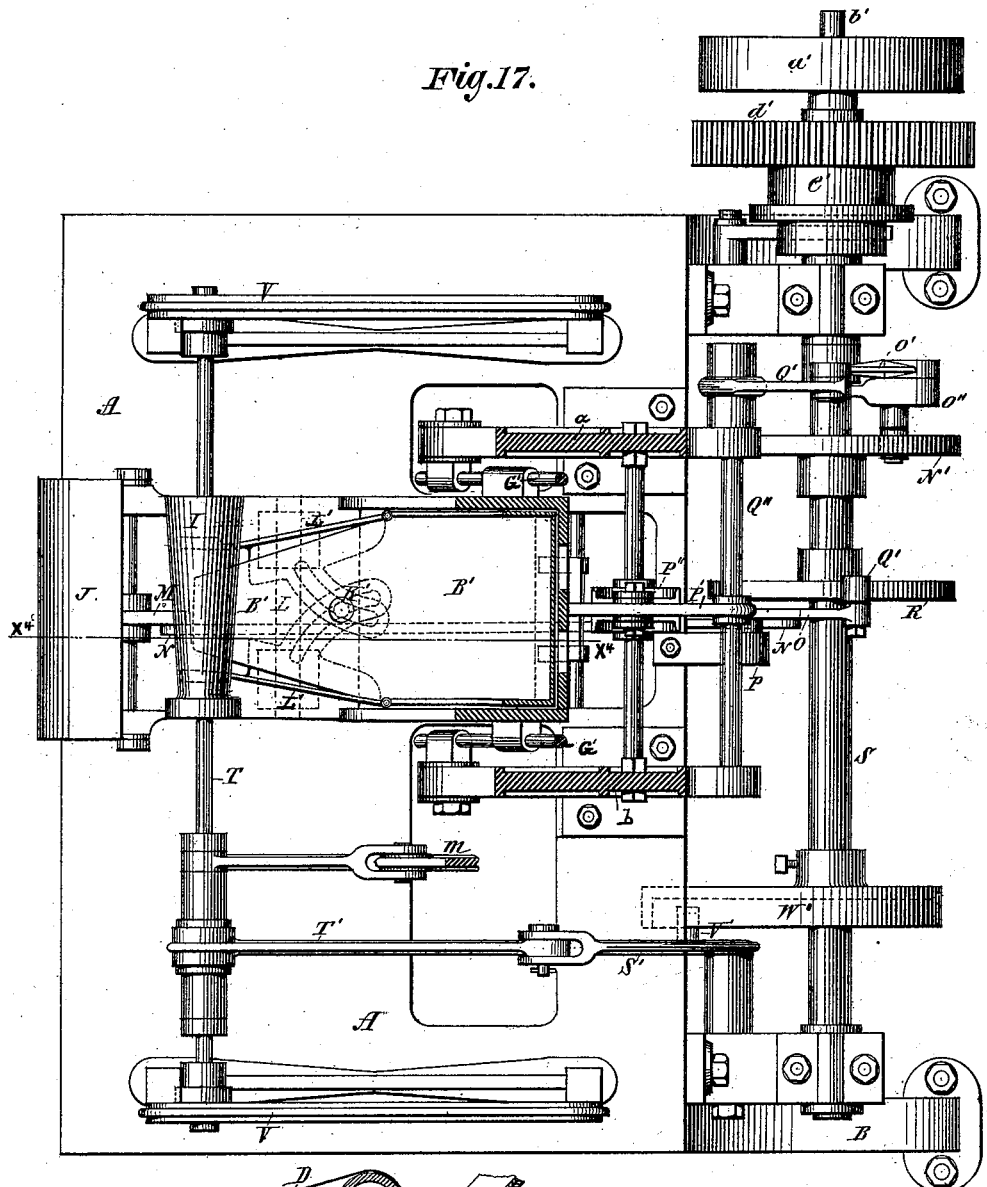

Referring to the accompanying drawings, Figure 1 is a side elevation of a cigar-bunching machine constructed according to the invention. Figs. 2, 3, and 4 are face views of the operating-cams secured on the driving-shaft of the machine and hereinafter referred to. Fig. 5 is a front plan view of the machine embodying the elements of the invention; Fig. 6, a rear plan view of the same; Fig. 7, an end view, partly in section, of the clutch on the right-hand end, looking at Fig. 6, of the main driving-shaft, the belt-wheel being illustrated by dotted lines. Fig. 8 is a rear plan view of said clutch mechanism, the same being partly in section on the dotted line $Y''' \ Y'''$ of Fig. 7. Fig. 9 is a central vertical section of the machine on the dotted line $X''' \ X'''$ of Fig. 5. Fig. 10 is an enlarged central vertical section of the upper portion of said machine. Fig. 11 is a horizontal transverse section on the dotted line $Z''' \ Z'''$ of Fig. 10. Fig. 12 is an end view of the shaft for regulating the depth of the pockets for receiving the different charges of tobacco from the main hopper, this shaft being the one illustrated in Fig. 11. Fig. 13 is an enlarged front plan view of the upper portion of the machine. Fig. 14 is an end view of the charge-box with the door at the bottom thereof in closed position. Fig. 15 is a front plan view of same, with said door illustrated as being open and the conveying-chute as being in its lower position. Fig. 16 is an end view of the charge-box with its door and chute as represented in Fig. 15. Fig. 17 is an enlarged sectional view on the dotted line $Y^4 \ Y^4$ of Fig. 9, looking downward, and illustrating the bed of the machine; and Fig. 18, a vertical transverse section on the dotted line $X^4 \ X^4$ of Fig. 17.

In the accompanying drawings, A designates the bed-plate or base of the machine, said bed-plate being supported upon legs B and carrying the elevated portion or rolling-table C, which is of suitable length to permit the rolling of the bunch and of the proper width to support the rolling-apron D. At the front end of the table is provided the recess E, having adjustable end pieces, F, whereby the length of said recess may be adjusted at will in a well-known manner.

Upon the front edge of the table C is provided the plate G, which projects slightly over the said recess E, and has its upper surface about on a level with the upper surface of the table C, the latter being suitably recessed to receive the thickness of the said plate G. The apron D is secured at its rear end upon a rod, H, as shown more clearly in Fig. 18, whence the apron passes forward over the table C, reciprocating roller I, and segment J, at the front portion of which the said apron is fastened to the rod K. The segment J is mounted upon the rod L and has a movement with the same.

Figure 18:
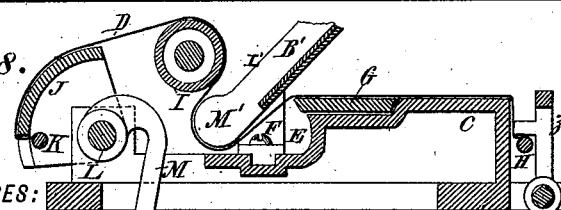

Upon the rod L at about its center, as illustrated in Figs. 9, 17, and 18, is rigidly secured the upper end of the arm M, which is connected at its lower end to the front end of the connecting-rod N, the rear end of the latter being pivoted in the lower end of the long arm of the bell-crank lever O, which is pivoted to the bracket P and carries in the end of its short arm the friction-wheel Q, which bears against and is actuated by the cam R, secured upon the driving-shaft S. The purpose of the cam R, bell-crank lever O, connecting-rod N, and arm M is to effect a forward and backward rotation of the segment J during the operation of the machine, the object of this movement of the segment J being to slacken or tighten the rolling-apron D. When, during the rotation of the cam R, the segment J is turned forward or outward to the front edge of the bed-plate A, which is the position illustrated in Fig. 18, the apron D will be drawn taut, and when the segment is turned rearward or toward the reciprocating roller I the said apron will be slackened.

The operation of the segment J with its connection will be pointed out hereinafter.

The reciprocating roller I is mounted upon the rod T, (illustrated in Fig. 17,) which carries at its ends pinion-wheels, as shown in Fig. 1, engaging the inverted racks V, of well-known form, the purpose of the racks and pinions being to guide the rod T during the operation of the machine. Upon the shaft T of the reciprocating roller I is mounted the vertical arms W, as illustrated in Fig. 5, which carry in their upper ends the supplemental shaft or rod X, supporting the small roller Y, whose surface lightly impinges the surface of the apron D and presses it with light pressure against the surface of the reciprocating roller I. The object of the small roller Y is to cause the apron D to return to the front portion of the bed-plate A with the roller I after the bunch has been rolled from the rear end of the table C. It has been found desirable to insure the return to the front portion of the bed-plate of all that portion of the apron D which is usually slackened after the bunch has left it instead of leaving the loose portions of the belt at the rear end of the table. The tendency of the roller I upon returning to the front portion of the bed-plate is to pass along under the apron D; but where the roller Y is made use of sufficient friction is created to draw the apron with the roller I during its movement to the front of the bed-plate. Upon the bed-plate A at the rear end of the table C is provided a bunch-receiver, Z, consisting of a pivoted frame to receive the bunch from the apron after the same has been rolled in a well-known manner.

Upon the bed-plate A is mounted the standards $a$ $b$, between which is supported the hopper $c$, for containing the scrap-tobacco to be used in the manufacture of the bunches. The lower portion of the hopper $c$ tapers inward, and has an opening, $d$, at its lower end, the surfaces around said opening being suitably conformed to snugly fit the surfaces of the cylinder $e$, as illustrated in Fig. 9. Within the hopper $c$ is provided the transverse shafts $f$ $g$, respectively, the ends of the shafts being mounted in the standards $a$ $b$, as illustrated in Figs. 5 and 6. As indicated in Fig. 9, the shaft $f$ is provided with the series of radial arms $h$, which, during the partial rotation of the shaft $f$, operate to feed the scrap-tobacco downward. The shaft $g$, in the lower portion of the hopper $c$, is illustrated more clearly in Fig. 10, where it will be seen that upon said shaft is secured a collar, $i$, having recesses $j$ to receive the flexible radial strips or blades $k$, extending from one side of the lower end of the hopper to the other side thereof. The shaft $g$ has an intermittent rotary movement during the operation of the machine, and this movement is imparted to the collar $i$, carrying the blades $k$, which are equidistant from each other and operate to feed the tobacco in sufficient quantities to the charge boxes or receptacles $l$ in the cylinder $e$ as said boxes are brought in line with the aperture $d$ in the lower end of the hopper $c$. The shafts $f$ $g$ receive their movement from the arm $m$ during the reciprocating movement of the roller I. The upper end of the arm $m$ is keyed on the shaft $f$, and said arm carries the rack $n$, which engages the pinion $o$, secured on the outer end of the shaft $g$, and hence during the movement of the arm $m$ with the roller I the shaft $f$ is given a rocking movement in the hopper and the shaft $g$ is given a rotary movement, the shaft $g$ rotating in one direction during the movement of the roller I toward the rear of the machine and in an opposite direction during the forward movement of said roller I. The cylinder $e$ is a metal casting provided with the recesses or receptacles $l$, of sufficient dimensions to fit beneath the aperture $d$ in the hopper $c$ and to receive the platens $p$, which are shown more clearly in Figs. 10 and 11. The cylinder $e$ is mounted upon the shaft $q$, which has bearings in the standards $a$ $b$, and carries at its center the elongated pinion-wheel $r$, engaging the racks $s$, secured to or forming a part of the platens $p$, the purpose of the pinion-wheel and racks being to render the platens adjustable in their recesses, according to the quantity of tobacco it is desired shall be fed downward to the rolling-apron for the bunches to be rolled. All of the racks $s$ engage the pinion-wheel $r$, and hence, when said wheel is rotated with the shaft $q$, a simultaneous motion will be imparted to all of the platens $p$, moving them outward or inward, and hence regulating the depth of the recesses $l$ beyond the platens.

Upon one end of the shaft $q$ is provided the index-finger $t$, resting against a plate, $u$, provided with indicating marks or characters at its upper edge, as illustrated in Fig. 12, the purpose of the index-finger and indicating-characters being to enable the attendant to adjust the depth of the recesses $l$ without inconvenience, the index $t$ denoting upon the plate $u$ the extent of the movement of the platens $p$ during the turning of the shaft $q$ for the purpose of adjusting the depth of the recesses $l$. The shaft $q$ and cylinder $e$ have an intermittent rotary movement, said movement being secured through the medium of the ratchet $w$, mounted upon the end of the shaft $q$ and engaged by the pawl $x$, as indicated in Figs. 1 and 5, during the reciprocating movement of the arm $m$. The pawl $x$ is pivoted upon an arm, $y$, which is connected with the shaft $q$ and arm $m$, as indicated in Figs. 1 and 5. During the movement of the arm $m$ with the roller I toward the rear of the machine the pawl $x$ slides over the ratchet-wheel $w$ without affecting it; but during the opposite movement of the arm $m$ and roller I to the front of the machine the pawl $x$ is drawn into engagement with the ratchet $w$, and causes said ratchet, with the shaft $q$ and cylinder $e$, to have a one-quarter revolution, this being sufficient to move one of the recesses $l$ from beneath the hopper $c$ and to bring another of said recesses $l$ in line with the aperture $d$ in said hopper. The rear surface of the cylinder $e$ is inclosed by the plate $z$, as shown more clearly in Figs. 9 and 10, said plate $z$ being a rigid fixture and snugly conforming to the surface of the cylinder $e$, as illustrated in Fig. 10, and at the lower edge of the plate $z$ is pivotally secured the door $A'$, whose object is to prevent the escape of the tobacco from the lower receptacle or recess $l$ until such time as it may be desired to cause said charge of tobacco to move down the chute $B'$ to the pocket formed in the rolling-apron. The door $A'$ carries end pieces, $C'$, and on these end pieces are studs $D'$, as illustrated more clearly in Figs. 9, 10, 15, and 16, which rest upon the vertical edges $E'$ of the casting $F'$. The casting $F'$ has reciprocating movement on the inclined rods $G'$, as will be hereinafter more fully described, and during this movement the vertical edges $E'$ are moved against the studs $D'$, and either elevate or permit the depression of said studs with the door $A'$, according to the configuration of the said edges $E'$. The edges $E'$ are provided with the depression or cam-surface $I'$, as illustrated in Figs. 14 and 16, and when the studs $D'$ are in the lower portion of the depressed cam-surface $I'$ the door $A'$ will be, of its own weight, opened, as illustrated in Figs. 15 and 16. The studs $D'$ move down the depressed cam-edges $I'$ during the downward movement of the casting $F'$. During the upward movement of the casting $F'$, however, the studs $D'$ are caused to ride up the cam-edges $I'$, closing the door $A'$, as illustrated in Fig. 14.

Upon the front edges of the ends $C'$, carried by the door $A'$, are hinged the blades $J'$, which may be moved to the angle desired, and are so arranged that when the door $A'$ is closed against the lower receptacle $l$ they will project forward, and that when the said door $A'$ is opened they will rest against the surfaces of the chute $B'$, as illustrated in Figs. 15 and 16, the purpose of the blades $J'$ being to so direct the tobacco sliding down the chute $B'$ from the lower charge-recess $l$ that it will be properly distributed for a bunch of the size and shape it is desired to produce. The chute $B'$ is made from sheet metal and secured by a set-screw, $K'$, to the casting $F'$, as indicated in Fig. 10 more clearly, and has a reciprocating movement with the said casting. The lower end of the chute $B'$ is provided with laterally-adjustable wings $L'$, as indicated in Fig. 17, the lower ends of the sides of said wings extending downward below the lower end of the chute, as indicated in Fig. 18, forming projecting arms $M'$ for forming the pocket in the apron to receive the charge of tobacco after sliding down the chute from the lower recess $l$. The reciprocating movement of the casting $F'$ with the chute $B'$ is created by the cam $N'$, secured on the driving-shaft $S$, through the medium of the intermediate jointed arms, $O'$ $O''$, link $Q'$, shaft $Q''$, rocking arm or lever $P'$, and link $R'$, (see Figs. 9 and 17,) the latter being pivoted to the lower face of the said casting. During the revolution of the driving-shaft $S$ the cam $N'$, operating through the rods $O'$ $O''$ and link $Q'$, effects a rocking movement of the shaft $Q''$ and arm or lever $P'$, and causes the casting $F'$ to move upward or downward on the inclined rods $G'$. In Fig. 6 the casting $F$ is illustrated in its upward position, while in Figs. 9 and 10 the casting is in its lower position. The shaft $T$ of the roller $I$ is given a reciprocating movement from the driving-shaft $S$ through the intermediate rods, $S'$ and $T'$, as illustrated more clearly in Fig. 17, the said rods being pivotally secured to each other, and the front end of the rod $T'$ being collared on the shaft $T$, while the rear end of the rod $S'$ is pivotally secured to the frame of the machine and carries the roller $V'$, which is engaged by the cam $W'$, during the revolution of which the arm $S'$ is given a rocking movement on its pivot, and is caused through the arm $T'$ to draw the shaft $T$, with the roller $I$, toward the rear of the bed-plate or to return said shaft $T$ and roller $I$ to the front portion of said bed-plate.

From the foregoing description it will be observed that the roller $I$ for rolling the bunch is given its usual reciprocating movement from the driving-shaft $S$ through the medium of the cam $W'$ and rods $S'$ $T'$, and that during the reciprocating movement of the roller $I$ its shaft $T$ actuates the vibratory rod $m$ to impart a vibratory movement to the feed-shaft $f$ and blades $h$, a rotary movement to the shaft $g$, with its radial blades $k$, and an intermittent rotary movement to the cylinder $e$, which carries the separate charges of tobacco from the hopper $c$ and delivers them upon the chute $B'$. It has also been pointed out hereinbefore that the sliding movement of the chute $B'$ and casting $F'$ is caused by the rotation of the cam $N'$, operating through the rods $O'$ $O''$, link $Q'$, shaft $Q''$, arm or lever $P'$, and link $R'$, and that while the casting $F'$ is in its upward position its sides $E'$, acting on the lugs $D'$, retain the door $A'$ in a closed position against the lower recess $l$ of the cylinder $e$, said door $A'$ being permitted to open upon the descent of the casting $F'$, the lugs $D'$ sliding down the incline or cam edge $I'$, as shown in Fig. 16, while the door $A'$ is opening. On the arm or lever $P'$ is hung the bearing-block $P''$, which impinges the soft roller $P'''$, and operates to steady the movement of the parts and prevents the rattling or jarring of same during the operation of the machine. During the revolution of the driving-shaft $S$ the cam $R$ actuates, through the bell-crank lever $O$ and rod $N$, the arm $M$ and segment $J$. When the roller $I$ is at the front portion of the rolling-table $C$, and before the chute $B'$ has descended to the position illustrated in Figs. 9 and 18, the segment $J$ is in its upward position or turned toward the roller $I$, the slack of the apron $D$ being at that time between the segment J and said roller. The segment J is permitted to turn upward by the roller Q (shown in Fig. 9) entering the depression in the cam R. Upon the descent of the chute B' the segment J is caused by the cam R to turn to the position illustrated in Figs. 9 and 18, in order that only sufficient slack in the apron may be left to form the pocket for the reception of the charge of tobacco deposited by the chute B'. A spring, N''', (see Fig. 1,) retains the roller Q in contact with the cam R.

In the operation of the machine the scrap-tobacco is placed in the hopper $c$, and is therein agitated and fed downward by means of the radial plates $h$ and $k$, connected with the shafts $f$ $g$, respectively, while at the same time the cylinder $e$ is being rotated toward the rear of the machine. At each quarter-revolution of the cylinder $e$ one of the receptacles or recesses $l$ is brought beneath the aperture $d$ in the lower end of the hopper $c$ and receives a charge of tobacco sufficient for the filler of a cigar. After the recess or receptacle $l$ receives its charge of tobacco the cylinder $e$ is given another quarter-revolution, bringing the said receptacle against the plate $z$, (illustrated in Fig. 10,) while another receptacle, by the same movement, is brought beneath the aperture $d$ in the hopper $c$ to receive another charge of tobacco. At the next quarter-revolution of the cylinder $e$ the receptacle $l$ first receiving the charge of tobacco is brought over the door A', at which time the casting F' and chute B' descend, forming a pocket in the apron D and permitting the opening of the door A', when the tobacco in the said recess or receptacle $l$ will slide down the chute B', first striking the wings or blades J', and finally entering the pocket in the apron D. The cam N' will then cause the casting F' and chute B' to ascend and close the door A', while the cam W' will cause the shaft T and roller I to move rearward over the rolling-table C, rolling the bunch in the customary manner, the usual binder having first been placed upon the apron prior to the descent of the chute B' and the charge of scrap-tobacco. During the movement of the roller I to the rear of the machine an additional charge of tobacco will be fed into the receptacle or recess of the cylinder $e$ coming beneath the aperture $d$, and a full receptacle or recess $l$ will be moved against the closed door A' preparatory to depositing another charge of tobacco upon the chute B' at the next descent of the latter. After the roller I has reached the rear edge of the rolling-table C the finished bunch will be caught by the customary bunch-receiver. The cams R, N', and W', with the shaft S, make one complete revolution during each complete movement of the roller I and shaft T from the front end of the rolling-table C to the rear end of the same and back again to its former position, and hence with each rotation of the driving-shaft S one complete bunch is formed.

During the operation of the machine the pocket in the apron is depressed into the recess E, and as the reciprocating roller I is started on its movement—as in the operation of rolling a bunch—the projecting edge of the plate G allows the body of tobacco, with the adjacent portion of the pocket in the apron, to sag under it, the effect of which is to prevent the roller I, while closing over the full pocket, from throwing the loose tobacco forward onto that portion of the binder not directly in the recess E. The plate G, with its projecting edge, thus aids in confining the tobacco in the pocket formed in the apron to receive it and in checking the tendency of the tobacco from being projected therefrom by the roller I when the latter is moving over the said pocket to roll the bunch.

The plate G is shown detachable in the drawings in order that it may be understood that the position of said plate with respect to the recess E may be such as may suit it for the size of the bunches to be formed. The projecting edge of the plate is the part which in use allows the pocket in the rolling-apron to sag under it, and as the roller I is started on its movement toward the rear end of the rolling-table the said projecting edge of the plate G aids in closing the pocket while the tobacco is below it. The plate G as an independent element is illustrated in Letters Patent heretofore granted to me April 10, 1888, and numbered 380,969, in which the plate is shown adjustable.

The driving-shaft S may be driven by either hand or steam power, and in the accompanying drawings I illustrate an application of devices by which steam-power may be conveniently utilized in operating the machine.

Referring to Figs. 5, 6, 7, 8, and 17, $a'$ denotes the belt-wheel, mounted upon the shaft $b'$, carrying the pinion-wheel $c'$, which meshes with the spur gear-wheel $d'$, loosely mounted upon the end of the driving-shaft S. Upon the shaft S, adjacent to the gear-wheel $d'$, is provided the box $e'$, containing the sliding bar $f'$, which has a spring-tension toward the gear-wheel $d'$, and is adapted at the proper time to enter the recess $g'$ (indicated by dotted lines in Fig. 8) and to cause the rotation of the shaft S with the gear-wheel $d'$, the box $e'$ and bar $f'$ operating as a clutch of well-known form and construction for connecting the gear-wheel $d'$ and shaft S' when it is desired that the latter shall be rotated from the band-wheel $a'$.

In the use of the clutch mechanism illustrated in Figs. 7 and 8 I employ the pitman-rod $h'$, connecting the treadle $i'$ with the pivoted bar $j'$, having a narrow upper edge adapted when in the position illustrated in Figs. 7 and 9 to withdraw the bar $f'$ from engagement with the gear-wheel $d'$. The normal position of the bar $j'$ is that illustrated in Figs. 7 and 8, and while in this position the band-wheel $a'$ and gear-wheels $b'$ $d'$ may rotate without affecting the driving-shaft S. When, however, the operator has placed a binder on the apron D, the pressure of the foot on the treadle $i'$ will operate to withdraw the arm $j'$ from immediate contact with the bar $f'$, and the spring-tension of the latter will cause it to engage the recess $g'$, when the movement of the band-wheel $a'$ will be communicated to the driving-shaft S. The pressure of the foot is retained upon the treadle $i'$ until the roller I and shaft T complete their movement to the rear of the rolling-table C and back again to their normal position, which is that illustrated in Figs. 9 and 18, whereupon the pressure on the treadle will be released and the bar $j'$ will disengage the bar $f'$ from the gear-wheel $d'$, and the shaft S will remain at rest until the operator has placed another binder on the apron D and the chute B' has formed the pocket and deposited the tobacco for an additional bunch, when the foot will be again pressed against the treadle $i'$ and communication established between the band-wheel $a'$ and the shaft S. After the bunch has been rolled from the rear end of the table C it is taken by the operator and placed in the usual mold-board, $m'$, sustained by the standard $n'$ and box $o'$ in a well-known manner.

What I claim as my invention, and desire to secure by Letters Patent, is—

1. In a cigar-bunching machine, the inclined chute secured to a casting or frame, inclined guide-rods for controlling the movement of the chute, and mechanism for moving the said chute and frame on said rods from the driving-shaft, combined with a rolling-table, apron, and reciprocating roller, the elevated hopper for scrap-tobacco, and feed mechanism, substantially as and for the purposes set forth.

2. In a cigar-bunching machine, the chute having adjustable wings at its lower end and connected with the frame or casting, the inclined guide-rods for said frame, and mechanism, substantially as described, for imparting an inclined sliding movement to the chute, combined with the rolling-table, apron, reciprocating roller, and hopper for scrap-tobacco, substantially as and for the purposes set forth.

3. The rolling-table having at its front end a recess and plate, G, combined with the reciprocating roller and the chute secured to a frame and having an inclined sliding movement, the lower end of the chute having adjustable wings L' and projections M' at opposite sides extending below the chute, substantially as and for the purposes set forth.

4. In a cigar-bunching machine, the rotary cylinder $e$, containing the recesses $l$, the confining-plate $z$ for said cylinder, and the hinged door A', which when open operates as a chute for the tobacco, combined with the chute B', for conveying the charges of tobacco measured in said recesses to the rolling-table, the elevated hopper for containing the tobacco in bulk, and mechanism for rotating the said cylinder and for opening and closing said door, substantially as shown and described.

5. In a cigar-bunching machine, the cylinder $e$, containing recesses $l$, the platens $p$, having racks $s$, pinion $r$, meshing with said racks, shaft $q$, and confining-plate $z$, having door A', combined with the chute for conveying the tobacco from said recesses to the rolling-table, an elevated hopper for the tobacco in bulk, and mechanism for rotating the said cylinder and for opening and closing said door, substantially as set forth.

6. In a cigar-bunching machine, the cylinder $e$, containing recesses $l$ and platens $p$, the confining-plate $z$, and the pivoted door A', operating in conjunction therewith and provided with lateral projections D', combined with the sliding chute and frame connected therewith, the sides of said frame forming cams for opening and closing door A', and an elevated hopper for feeding charges of tobacco to said recesses, substantially as set forth.

7. In a cigar-bunching machine, the cylinder $e$, containing recesses $l$, the platens $p$, having racks $s$, pinion $r$, meshing with said racks, shaft $q$, having index-finger $t$, and index-plate $u$, combined with the confining-plate $z$, provided with a pivoted door, A', the chute for conveying the charges of tobacco to the rolling-apron, and the elevated hopper for feeding the tobacco to said recesses, substantially as set forth.

8. In a cigar-bunching machine, the elevated hopper for the tobacco in bulk, a charge-receptacle below said hopper, a door connected with said receptacle to confine or permit the escape of the charges of tobacco therefrom, mechanism, substantially as described, for opening and closing said door, and the bunch-rolling mechanism, combined with the chute leading from the charge-receptacle to the rolling mechanism, and the blades J' J', secured at the upper end of the chute, said blades converging toward each other at their outer ends and constituting walls to direct or distribute the charges of tobacco on said chute, substantially as and for the purposes specified.

9. In a cigar-bunching machine, the elevated hopper having a reduced lower end, combined with the horizontal shaft $g$ in said lower end and having the collar $i$, provided with the recesses $j$, and radial blades $k$, of flexible material, the receptacle below said hopper for measuring the charges of tobacco, and having a hinged door, A', mechanism, substantially as described, for operating said door, and a chute for conveying the charges of tobacco from said receptacle to the rolling mechanism, substantially as set forth.

Signed at New York, in the county of New York and State of New York, this 13th day of July, A. D. 1888.

JOHN R. WILLIAMS.

Witnesses:
CHARLES C. GILL,
W. A. C. MATTHIE.